US012626411B2

(12) United States Patent
Nguyen Canh et al.

(10) Patent No.: US 12,626,411 B2
(45) Date of Patent: May 12, 2026

(54) METHOD AND APPARATUS FOR ADAPTIVE QUANTIZATION FOR UV ATTRIBUTE IN SYMMETRY MESH

(71) Applicant: Tencent America LLC, Palo Alto, CA (US)

(72) Inventors: Thuong Nguyen Canh, San Bruno, CA (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 224 days.

(21) Appl. No.: 18/467,241

(22) Filed: Sep. 14, 2023

(65) Prior Publication Data

US 2024/0161345 A1 May 16, 2024

Related U.S. Application Data

(60) Provisional application No. 63/423,260, filed on Nov. 7, 2022.

(51) Int. Cl.
*G06T 9/00* (2006.01)
*H04N 19/124* (2014.01)

(52) U.S. Cl.
CPC ........... *G06T 9/001* (2013.01); *H04N 19/124* (2014.11); *G06T 2210/12* (2013.01)

(58) Field of Classification Search
None
See application file for complete search history.

(56) References Cited

U.S. PATENT DOCUMENTS

| | | | |
|---|---|---|---|
| 2010/0066760 A1* | 3/2010 | Mitra | G06T 19/20 |
| | | | 345/629 |
| 2014/0028665 A1 | 1/2014 | He et al. | |
| 2014/0228665 A1* | 8/2014 | Albert | A61B 5/0245 |
| | | | 600/384 |
| 2017/0018111 A1* | 1/2017 | Collet Romea | G06T 9/00 |
| 2019/0259184 A1* | 8/2019 | Ostermann | H04N 13/194 |
| 2020/0265611 A1* | 8/2020 | Hemmer | G06T 9/001 |
| 2024/0096016 A1* | 3/2024 | Driscoll, III | G06T 15/04 |

OTHER PUBLICATIONS

International Search Report with Written Opinion issued Jan. 26, 2024 in Application No. PCT/US23/32987.

(Continued)

*Primary Examiner* — Miya J Cato
(74) *Attorney, Agent, or Firm* — Sughrue Mion, PLLC

(57) ABSTRACT

A method performed by an encoder comprises extracting from an input mesh an extracted half symmetry mesh, the input mesh comprising a first side and a second side, the second side being opposite to the first side, the extracted mesh comprising only one of the first side and the second side; quantizing the extracted half symmetry mesh at a first bitdepth to generate a first quantized mesh; reparameterizing the first quantized mesh to generate a reparameterized mesh that includes a reduction in one or more empty spaces in the first quantized mesh; quantizing the reparameterized mesh at a second bitdepth different from the first bitdepth to generate a second quantized mesh; and encoding the second quantized mesh into a bitstream.

18 Claims, 11 Drawing Sheets

500

(56)     References Cited

OTHER PUBLICATIONS

Khaled Mammou et al., "[V-CG] Apple's Dynamic Mesh Coding CfP Response", Apple Inc., International Organization for Standardization, Organisation Internationale De Normalisation, ISO/IEC JTC 1/SC 29/WG 7, Coding of Moving Pictures and Audio, Online—Apr. 2022, p. 24.

European Search Report issued Feb. 17, 2026 in EP Application No. 23889320.0.

Xiang Zhang (Tencent) et al: "[V-CG] Tencent's Dynamic Mesh Coding CfP Response", 138. MPEG Meeting; Apr. 25-29, 2022; Online; (Motion Picture Expert Group or ISO/IEC JTC1/SC29/WG11), No. m59295 Apr. 16, 2022 (Apr. 16, 2022), XP030330544.

* cited by examiner

800

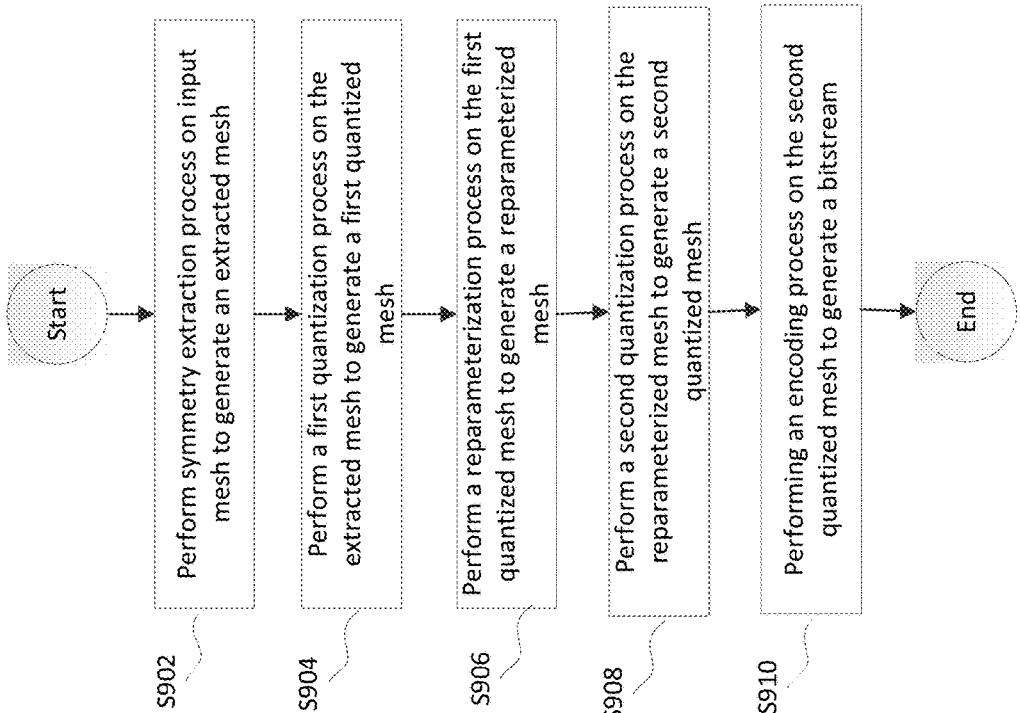

Start

S902 — Perform symmetry extraction process on input mesh to generate an extracted mesh S904 — Perform a first quantization process on the extracted mesh to generate a first quantized mesh S906 — Perform a reparameterization process on the first quantized mesh to generate a reparameterized mesh S908 — Perform a second quantization process on the reparameterized mesh to generate a second quantized mesh S910 — Performing an encoding process on the second quantized mesh to generate a bitstream End

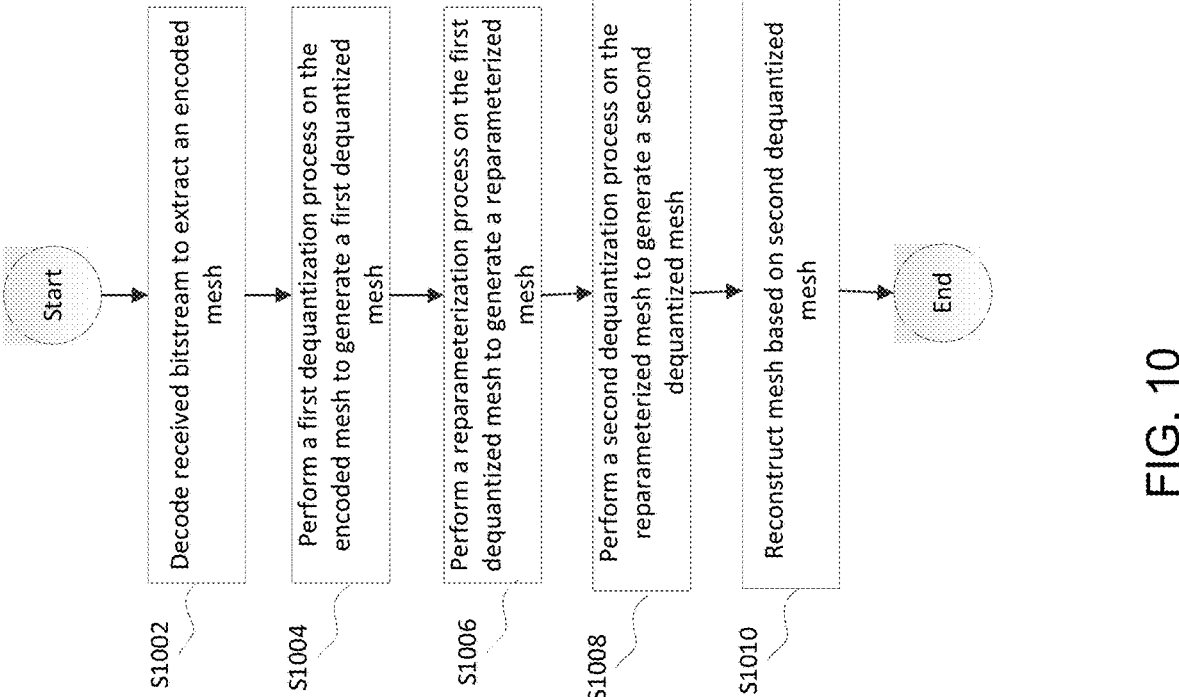

S1002   Decode received bitstream to extract an encoded mesh

S1004   Perform a first dequantization process on the encoded mesh to generate a first dequantized mesh S1006   Perform a reparameterization process on the first dequantized mesh to generate a reparameterized mesh S1008   Perform a second dequantization process on the reparameterized mesh to generate a second dequantized mesh S1010   Reconstruct mesh based on second dequantized mesh

METHOD AND APPARATUS FOR ADAPTIVE QUANTIZATION FOR UV ATTRIBUTE IN SYMMETRY MESH

CROSS-REFERENCE TO RELATED APPLICATION

This application claims priority from U.S. Provisional Application No. 63/423,260 filed on Nov. 7, 2022, the disclosure of which is incorporated herein by reference in its entirety.

FIELD

This disclosure is directed to a set of advanced video coding technologies. More specifically, the present disclosure is directed to adaptive quantization for UV attributes in a symmetry mesh.

BACKGROUND

VMesh is an ongoing MPEG standard to compress meshes. The current VMesh reference software compresses meshes based on decimated base meshes, displacements vectors, and motion fields. The displacements are calculated by searching the closest point on the input mesh with respect to each vertex of the subdivided based mesh. The displacement vectors are transformed into wavelet coefficients by a linear lifting scheme, and then the coefficients are quantized and coded by a video codec or an arithmetic codec. Unfortunately, only local characteristic of mesh is utilized to compress the mesh but not global characteristics like symmetry.

Reflection symmetry is a popular characteristic of mesh encoding, especially computer generated meshes. Symmetry may be utilized to compress symmetry mesh. Vertices are divided into a left and a right part of a symmetry plane. The left part is encoded by mesh coding while the right part is encoded by a symmetry prediction and displacement coding. UV attributes may display a certain level of symmetry.

Reparameterization of UV attributes may be performed by re-arranging and/or regenerating a UV map and associated texture map. Reparameterization may be performed to improve lossy mesh compression performance. In general, a decimation process may be applied and followed up by reparameterization such as UV Atlas as in VMesh. UVAtlas is very efficient for fragmented UV attributes.

However, these techniques do not provide an effective method to quantize a symmetry UV. Furthermore, these techniques to not provide a method to reparametrize UV attributes for lossless and lossy compression. Additionally, these methods to reparameterize UV without modifying the associated texture.

SUMMARY

According to one or more embodiments, a method performed by at least one processor of an encoder comprises extracting from an input mesh an extracted half symmetry mesh, the input mesh comprising a first side and a second side, the second side being opposite to the first side, the extracted mesh comprising only one of the first side and the second side; quantizing the extracted half symmetry mesh at a first bitdepth to generate a first quantized mesh; reparameterizing the first quantized mesh to generate a reparameterized mesh that includes a reduction in one or more empty spaces in the first quantized mesh; quantizing the reparameterized mesh at a second bitdepth different from the first bitdepth to generate a second quantized mesh; and encoding the second quantized mesh into a bitstream.

According to one or more embodiments, an encoder comprises: at least one memory configured to store program code; and at least one processor configured to read the program code and operate as instructed by the program code, the program code including: extraction code configured to cause the at least one processor to extract from an input mesh an extracted half symmetry mesh, the input mesh comprising a first side and a second side, the second side being opposite to the first side, the extracted half symmetry mesh comprising one of the first side and the second side, first quantization code configured to cause the at least one processor to quantize the extracted half symmetry mesh at a first bitdepth to generate a first quantized mesh, reparameterization code configured to cause the at least one processor to reparameterize the first quantized mesh to generate a reparameterized mesh that includes a reduction in one or more empty spaces in the first quantized mesh, second quantization code configured to cause the at least one processor to quantize the reparameterized mesh at a second bitdepth different from the first bitdepth to generate a second quantized mesh, and encoding code configured to cause the at least one processor to encode the second quantized mesh into a bitstream.

According to one or more embodiments, a non-transitory computer readable medium having instructions stored therein, which when executed by a processor in an encoder cause the encoder to execute a method comprising: extracting from an input mesh an extracted half symmetry mesh, the input mesh comprising a first side and a second side, the second side being opposite to the first side, the extracted mesh comprising one of the first side and the second side; quantizing the extracted half symmetry mesh at a first bitdepth to generate a first quantized mesh; reparameterizing the first quantized mesh to generate a reparameterized mesh that includes a reduction in one or more empty spaces in the first quantized mesh; quantizing the reparameterized mesh at a second bitdepth different from the first bitdepth to generate a second quantized mesh; and encoding the second quantized mesh into a bitstream.

BRIEF DESCRIPTION OF THE DRAWINGS

Further features, the nature, and various advantages of the disclosed subject matter will be more apparent from the following detailed description and the accompanying drawings in which:

FIG. 9 is a flow chart of an example process for performing adaptive quantization, in accordance with embodiments of the present disclosure.

FIG. 10 is a flow chart of an example process for performing adaptive dequantization, in accordance with embodiments of the present disclosure.

DETAILED DESCRIPTION

Figure 1:
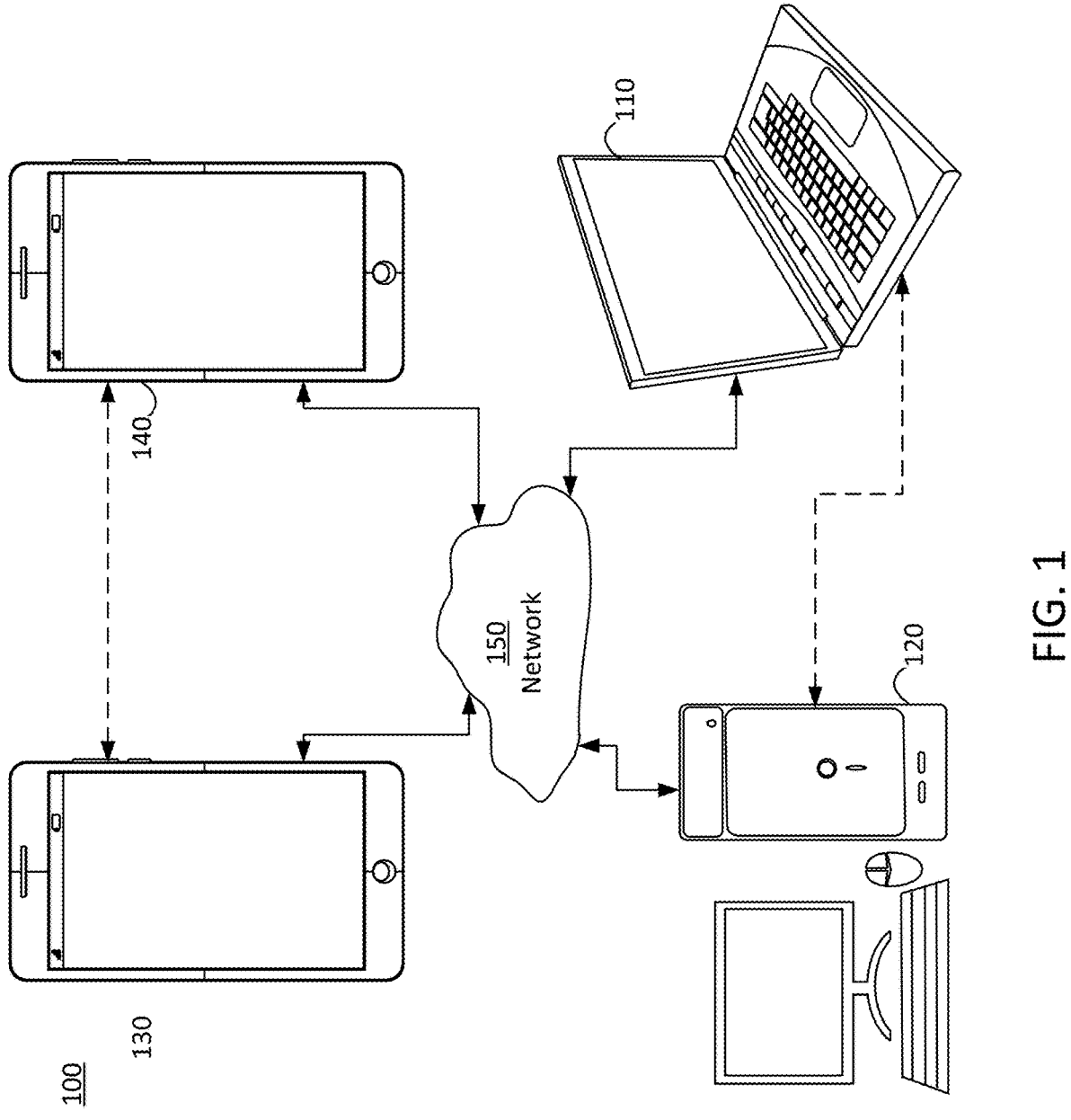
FIG. 1 is a schematic illustration of a block diagram of a communication system, in accordance with embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

Figure 2:
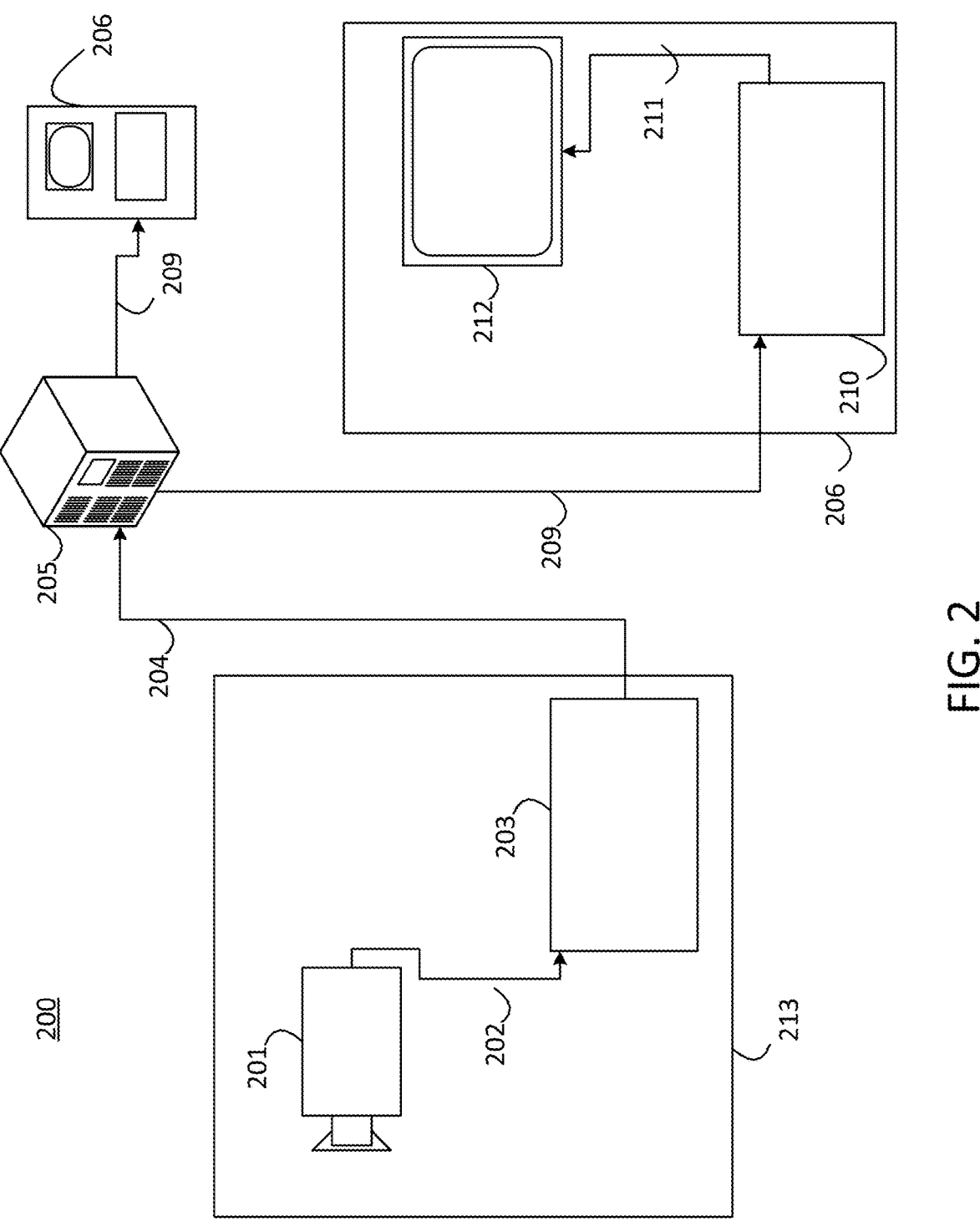
FIG. 2 is a schematic illustration of a block diagram of a streaming system, in accordance with embodiments of the present disclosure.

With reference to FIGS. 1-2, one or more embodiments of the present disclosure for implementing encoding and decoding structures of the present disclosure are described.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data, which may include mesh data, at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminals. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

FIG. 2 illustrates, as an example of an application for the disclosed subject matter, a placement of a video encoder and decoder in a streaming environment. The disclosed subject matter may be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 may create, for example, a stream 202 that includes a 3D mesh and metadata associated with the 3D mesh. The video source 201 may include, for example, 3D sensors (e.g. depth sensors) or 3D imaging technology (e.g. digital camera(s)), and a computing device that is configured to generate the 3D mesh using the data received from the 3D sensors or the 3D imaging technology. The sample stream 202, which may have a high data volume when compared to encoded video bitstreams, may be processed by the encoder 203 coupled to the video source 201. The encoder 203 may include hardware, software, or a combination thereof to enable or implement aspects of the disclosed subject matter as described in more detail below. The encoder 203 may also generate an encoded video bitstream 204. The encoded video bitstream 204, which may have e a lower data volume when compared to the uncompressed stream 202, may be stored on a streaming server 205 for future use. One or more streaming clients 206 may access the streaming server 205 to retrieve video bit streams 209 that may be copies of the encoded video bitstream 204.

The streaming clients 206 may include a video decoder 210 and a display 212. The video decoder 210 may, for example, decode video bitstream 209, which is an incoming copy of the encoded video bitstream 204, and create an outgoing video sample stream 211 that may be rendered on the display 212 or another rendering device (not depicted). In some streaming systems, the video bitstreams 204, 209 may be encoded according to certain video coding/compression standards.

A mesh may be a collection of vertices, edges, and faces that define a shape or an object. A 3D mesh may include a plurality of vertices, with each vertex associated with a 3D coordinate in a 3D space (e.g., x, y, z). A 2D mesh may include a plurality of vertices with each vertex associated a 2D coordinate in a 2D space (e.g., x and y). The vertices may be connected to form edges, where a collection of vertices may define a face.

Figure 3:
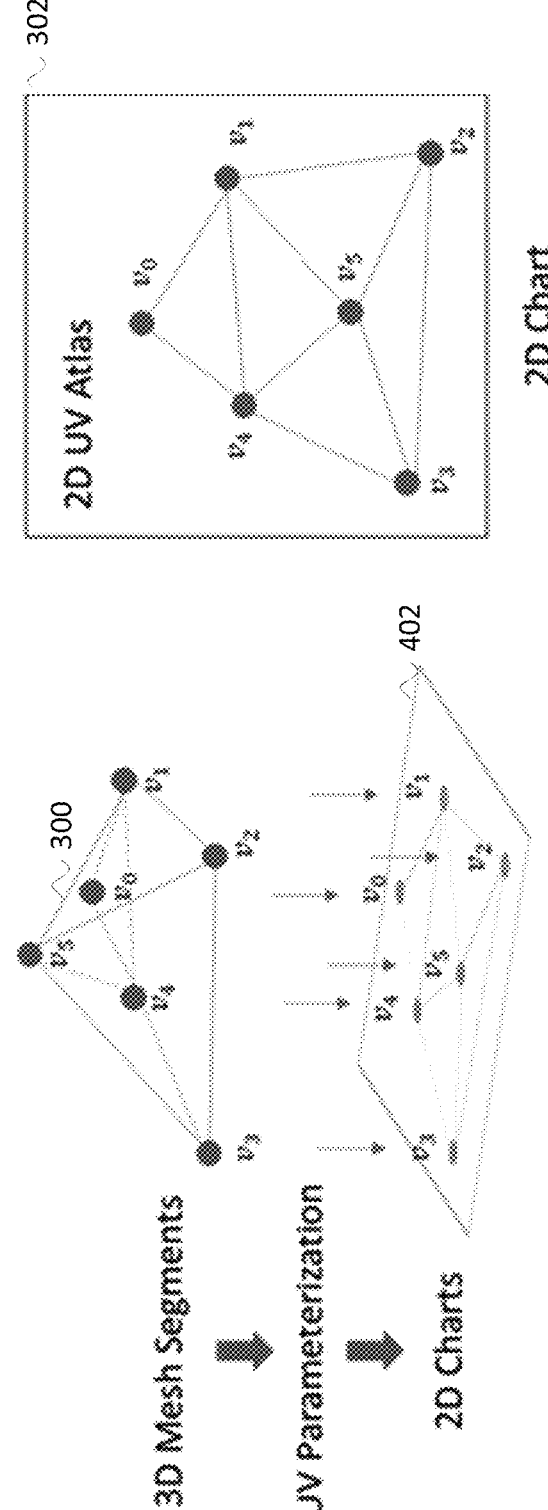
FIG. 3 illustrates an example of UV parameterization mapping from 3D mesh segments onto 2D charts, in accordance with embodiments of the present disclosure.

According to one or more embodiments, a 3D mesh may be partitioned into several segments (or patches/charts). Each segment may be composed of a set of connected vertices associated with their geometry, attribute, and connectivity information. As illustrated in FIG. 3, a UV parameterization process maps a mesh segment 300 onto a 2D chart in the 2D UV atlas (302, 304). Each vertex in the mesh segment may be assigned with a 2D UV coordinates in the 2D UV atlas. The vertices in a 2D chart may form a connected component as their 3D counterpart. The geometry and connectivity information of each vertex may be inherited from their 3D counterpart as well. Therefore, the UV coordinates map vertices in a 2D space to the 3D space based on associated UV attributes that include geometry and connectivity information.

Embodiments of the present disclosure are directed to adaptively quantizing UV coordinates in symmetry-based mesh coding. The embodiments of the present disclosure may be used separately or combined in any order and may be used for arbitrary polygon meshes.

According to one or more embodiments, segmentation is performed on an input mesh. As discussed above, a mesh may be a collection of vertices, edges, and faces that define a shape or an object. A 3D mesh may include a plurality of vertices, with each vertex associated with a 3D coordinate in a 3D space (e.g., x, y, z). A 2D mesh may include a plurality of vertices with each vertex associated a 2D coordinate in a 2D space (e.g., x and y). The vertices may be connected to form edges, where a collection of vertices may define a face.

Figures 4A, 4B:
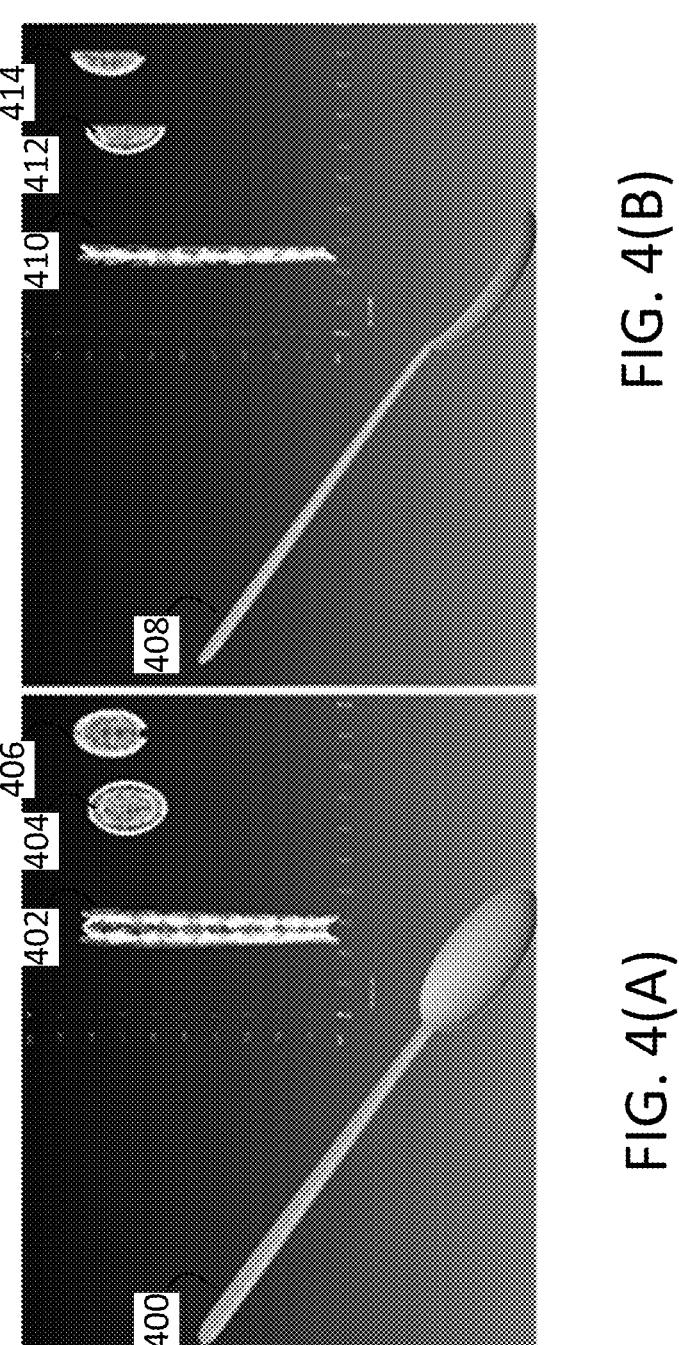
FIG. 4(A) is an illustration of a mesh and a corresponding UV attribute map, in accordance with embodiments of the present disclosure.
FIG. 4(B) is an illustration of a half symmetry mesh and a corresponding UV attribute map, in accordance with embodiments of the present disclosure.

The input mesh may be segmented into multiple non-connected parts in the UV attribute map. For example, FIG. 4(A) shows a UV map of a spoon mesh 400 that is segmented into three non-connected parts (402, 404, 406). FIG. 4(B) shows a UV map of the half spoon mesh 408 that is segmented into three non-connected parts (410, 412, 414).

As illustrated in FIGS. 4(A) and 4(B), a symmetry coding method may extract half of a symmetry UV mesh and leave empty spaces. In the context of symmetry-based coding, the remaining parts (e.g., FIG. 4(B)) are coded and later used as a reference to predict the other half of the UV information.

Figure 5:
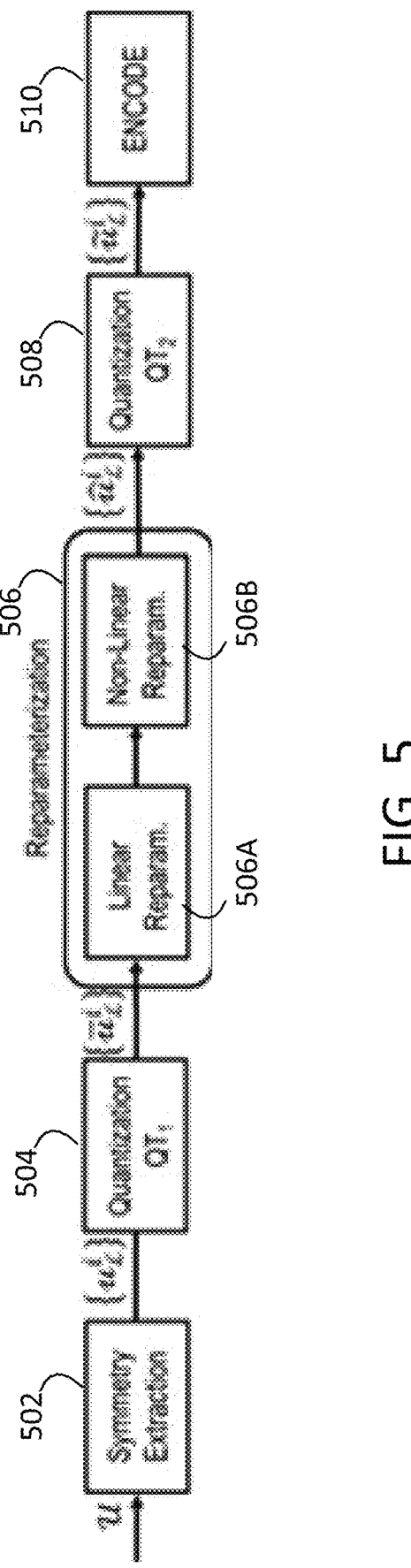
FIG. 5 is a schematic illustration of an example framework for reparameterizing a symmetry UV mesh with quantization, in accordance with embodiments of the present disclosure.

FIG. 5 illustrates an example framework for reparameterizing a symmetry UV mesh with quantization, in accordance with one or more embodiments. The framework 500 in FIG. 5 processes symmetry UV attributes.

In one or more examples, an input mesh $\mathcal{U}$ is provided to a symmetry extraction process 502 to extract a half symmetry mesh $\mathcal{U}_\mathcal{L}$ corresponding to the input mesh $\mathcal{U}$. In one or more examples, a symmetry extraction process may extract a portion of a mesh such as one side of a mesh corresponding to half of the mesh. Referring to FIGS. 4(A) and 4(B), the input mesh $\mathcal{U}$ may correspond to object 400, and the extracted half symmetry mesh $\mathcal{U}_\mathcal{L}$ may correspond to 408. The output of the symmetry extraction process 502 may be referred to as an extracted mesh. The other half is subjected to prediction by a symmetry prediction tools. As a result, in one or more examples, each part of the half-symmetry UV occupies only a smaller area of the UV attribute, and there are many empty spaces in between. In one or more examples, a reparameterization process is applied with two different quantization processes.

An example quantization process is described as follows. Firstly, the bounding box of UV attribute is estimated [$u_{min}$, $u_{max}$] and [$v_{min}$, $v_{max}$] in u and v direction, respectively. Secondly, the quantization step size $\Delta q$ is defined as $$\Delta q = \frac{\max(u_{max} - u_{min}, v_{max} - v_{min})}{2^{QT} - 1},$$

and the quantized UV is $$\overline{\mathcal{u}}_i = \left[ \frac{\mathcal{u}_i}{\Delta q} + \theta \right],$$

with $\theta$ is the quantization offset. Typically, it is set to $\theta = 0.5$ in the uniform quantization. A dequantized UV $\tilde{u}_i$ is calculated by $$\tilde{u}_i = \overline{u}_i \times \Delta q.$$

In summary, the disclosed method can extract from an input mesh an extracted half symmetry mesh. Here, the input mesh includes a first side and a second side, whereas the second side is opposite to the first side. Moreover, the extracted mesh includes only one of the first side and the second side, but not both. The disclosed method first quantizes the extracted mesh at a first bitdepth to generate a first quantized mesh. Then, the disclosed method can reparameterize the first quantized mesh to generate a reparameterized mesh that includes a reduction in one or more empty spaces in the first quantized mesh. Next, the disclosed method can quantize the reparameterized mesh at a second bitdepth different from the first bitdepth to generate a second quantized mesh. By doing these two steps reparameterization and two step quantization, the disclosed method can reduce the quantization error of the final quantized UV attributes.

The quantized UV may be encoded as illustrated in FIG. 5. In one or more examples, haft (half?) of the input UV attributed $\mathcal{U}$ is extracted as $\mathcal{U}_{\mathcal{L}}$ with multiple UV attributes $u_{\mathcal{L}}^i$.

In one or examples, the framework 500 includes a first quantization process 504 that receives the half symmetry mesh $\mathcal{U}_{\mathcal{L}}$ as input. The first quantization process 504 may perform quantization at a high bitdepth $QT_1$ to obtain the integer input. The output of the first quantization process 504 may be referred to as a first quantized mesh.

In one or more examples, a reparameterization process 506 may be performed to obtain a compact representation of the half-symmetry UV mesh. The output of the reparameterization process 506 may be referred to as a reparameterized mesh. This reparameterization may be used to reduce the empty space in UV attribute by a linear or non-linear transform. In one or more examples, the reparameterization process 506 may include a linear reparameterization process 506 that performs a linear transform to reduce the space between segments, thereby reducing a bounding box size of a UV mesh to benefit quantization.

In one or more examples, the reparameterization process 506 may include a non-linear reparameterization process 506B that performs a non-linear transform such as UVAtlas, which may be further utilized to reduce a fragment in UV attributes.

In one or more examples, the framework 500 may include a second quantization process 508 that receives the output of the reparameterization process 506 as an input. The second quantization process 508 may perform quantization at a bitdepth $QT_2$, where $QT_2 \leq QT_1$. The output of the second quantization process 508 may be referred to as a second quantized mesh, which may be an output of the final quantized UV attributes.

Figure 6:
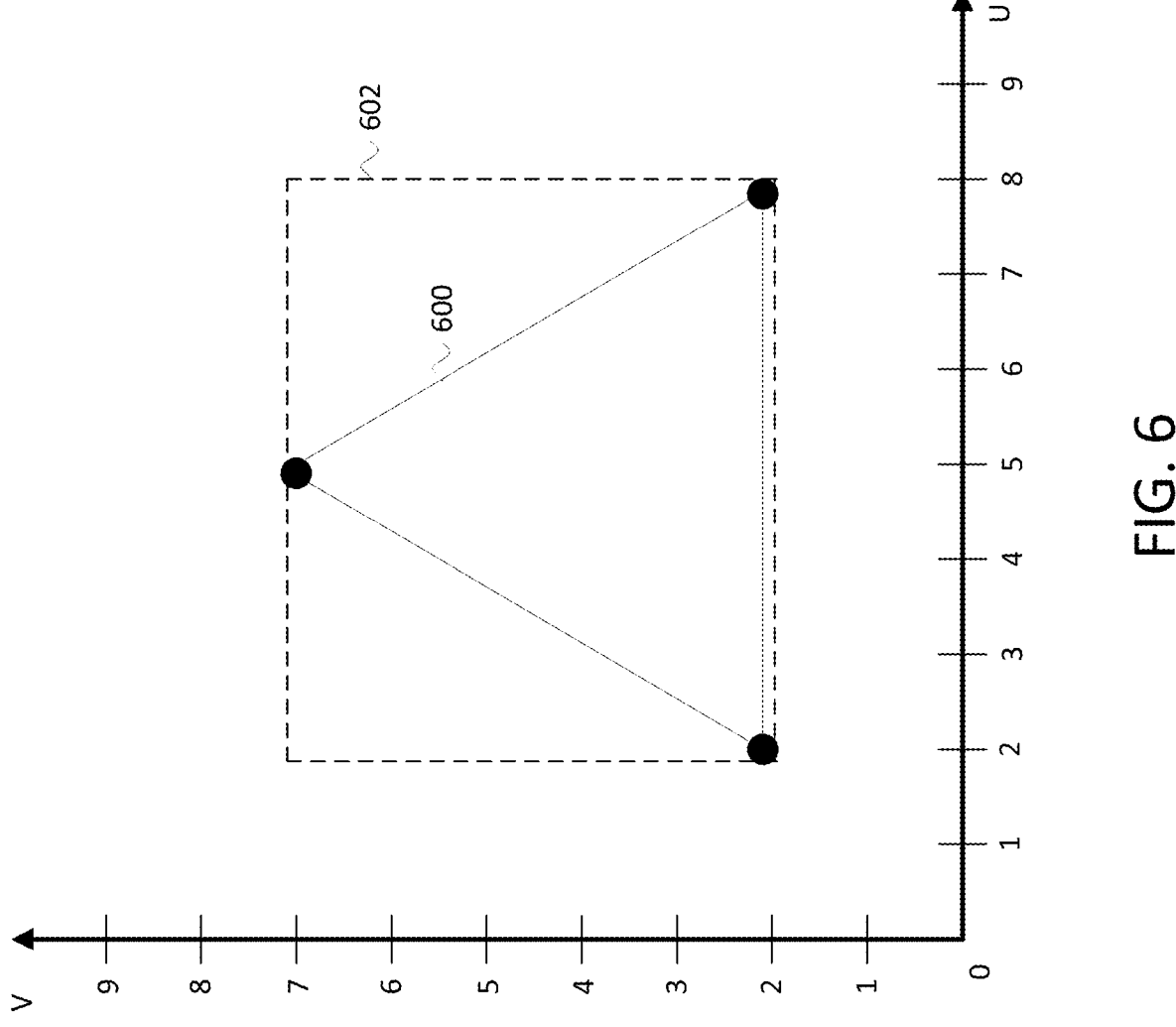
FIG. 6 is a schematic illustration of an example 2D mesh with a corresponding bounding box, in accordance with embodiments of the present disclosure.

According to one or more examples, a quantization process may be performed based on a bounding box. The bounding box of a UV mesh may be estimated $[u_{min}, u_{max}]$ and $[v_{min}, v_{max}]$ in u and v direction, respectively. FIG. 6 illustrates an example UV mesh 600 that is enclosed by bounding box 602. As illustrated in FIG. 6, the bounding box 602 includes a $u_{min}=2$, $u_{max}=8$, $v_{min}=2$, and $v_{max}=7$.

In one or more examples, the quantization step size $\Delta q$ may be defined as follows.

$$\Delta q = \frac{\max(u_{max} - u_{min}, v_{max} - v_{min})}{2^{QT} - 1} \qquad \text{Eq. (1)}$$

Figure 7:
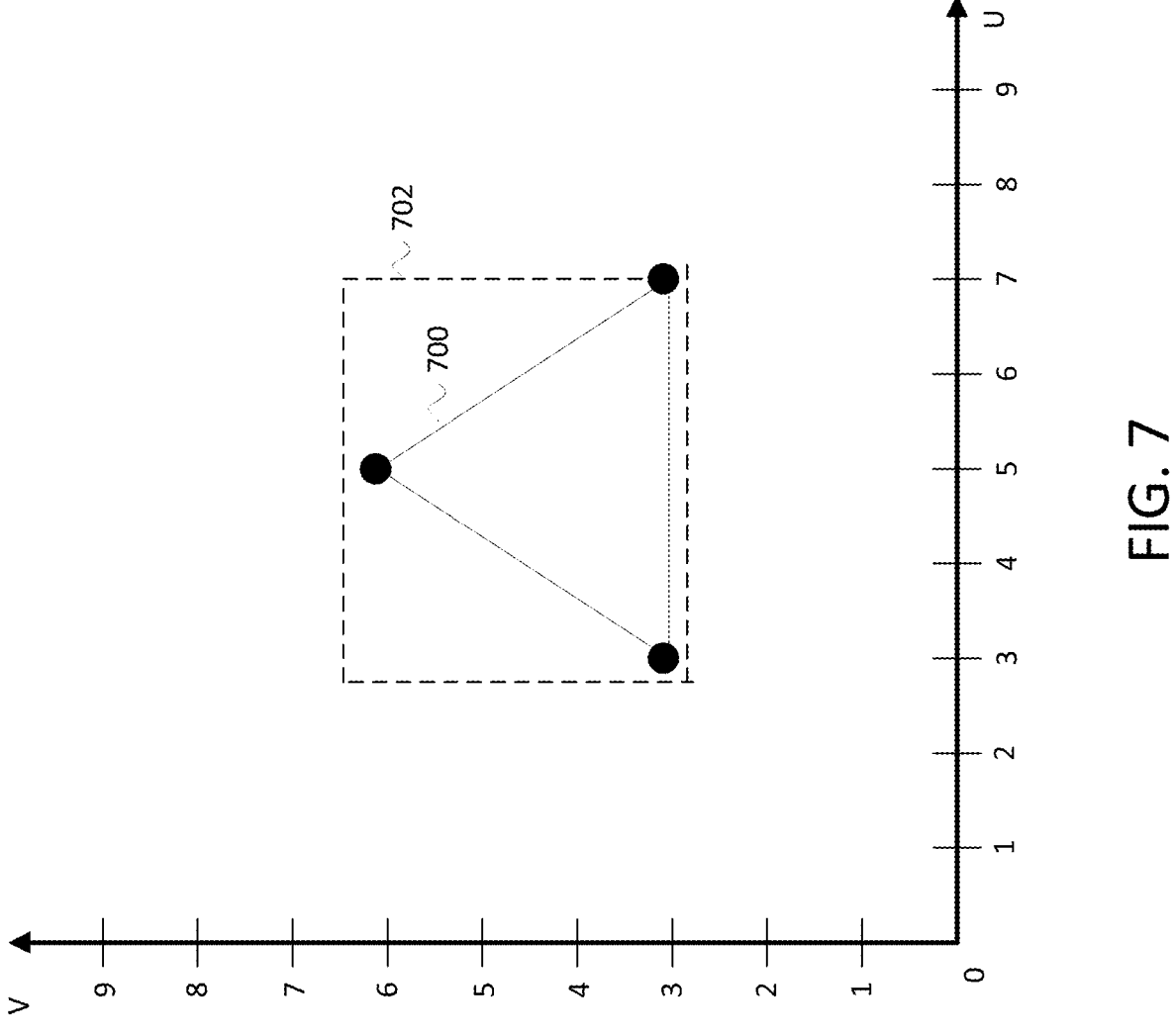
FIG. 7 is a schematic illustration of an example 2D mesh with a corresponding bounding box, in accordance with embodiments of the present disclosure.

The first quantization process 504 may be performed with a quantization step size determined in accordance with Eq. (1) with bitdepth $QT_1$. After the reparameterization process 506 is performed, the UV mesh 600 may be reduced resulting in a reduced bounding box. For example, FIG. 7 illustrates a mesh 700 that may correspond to an output of the reparameterization process 506 performed on the UV mesh 600. As illustrated in FIG. 7, the mesh is enclosed by bounding box 702, which includes $u_{min}=3$, $u_{max}=7$, $v_{min}=3$, and $v_{max}=6$. After the reparameterization process 506 is performed, the second quantization process 508 may be performed in accordance with Eq. (1) based on the parameters of bounding box 702 and the bitdepth $QT_2$.

In one or more examples, the quantized UV may be defined as follows.

$$\overline{u}_i = \left[ \frac{u_i}{\Delta q} + \theta \right], \qquad \text{Eq. (2)}$$

with $\theta$ as a quantization offset. In one or more examples, $\theta=0.5$ in uniform quantization.

In one or more examples, a dequantized UV $\breve{u}_i$ may be calculated as follows.

$$\breve{u}_i = \overline{u}_i \times \Delta q. \qquad \text{Eq. (3)}$$

By performing the two step reparameterization process, the quantization before and after the reparameterization process, the embodiments of the present disclosure are able to reduce a quantization error of the final quantized UV attributes.

According to one or more embodiments, a process is performed to minimize a final quantization error of a UV mesh. In one or more examples, a half-symmetry UV attribute $\mathcal{U}_{\mathcal{L}}$ is divided into m multiple disconnected segments (or charts) $\mathcal{U}_{\mathcal{L}}^i$, $i \in [1,m]$. Each segment may be associated with a 2D transform $q^i$ including factors such as transition, rotation, reflection, affine transform, etc. A $q^i$ 2D transform may be represented by 4 or 6 parameters. The reparameterization is an optimization process to find the set of m 2D transform $q^i$ that minimize a total area of a UV mesh as follows.

$$\{q_*^i\} = \min_{\{q^i\}} bbox\{\cup u_r^i * q^i\} \text{ st. } (u_r^i * q^i) \cap (u_r^i * q^i) = \emptyset, \qquad \text{Eq. (4)}$$

where $bbox(\mathcal{S})$ is the function to calculate the area of the bounding box of an UV set $\mathcal{S}$.

In one or more examples, a UV quantization parameter may be considered to minimize the quantization error after reparameterization. For example, a distance between two charts is larger than a threshold $\tau$ as follows.

$$\{q_*^i\} = \min_{\{q^i\}, QT} bbox\{\cup u_r^i * q^i\} \text{ st. } \mathcal{D}(u_r^i, u_r^j) > \tau. \qquad \text{Eq. (5)}$$

In one or more examples, the threshold is set as an integer time of the UV quantization step size as follows.

$$\tau = k \times \Delta q, k \in \mathbb{N}^+. \qquad \text{Eq. (6)}$$

The notation $\mathcal{D}(\mathcal{S}_1, \mathcal{S}_2)$ may represent a smallest L1 distance between all UV attributes in $\mathcal{S}_1, \mathcal{S}_2$.

According to one or more embodiments, a reparameterization process is performed while maintaining one or more UV attributes, thereby maintaining an original associated texture. For example, after finding the set of optimal transforms $$\{q_*^i\},$$

a corresponding inverse transform $$\{p_*^i\}$$

is estimated by minimizing the transformation error as follows.

$$p_*^i = \min_{p_*^i} \left\| u_r^i * q^i - u_r^i * q^i * p_*^i \right\|_2^2. \qquad \text{Eq. (7)}$$

In one or more examples, the inverse transforms may be signaled to the decoder to follow the order of reducing a size of a $\mathcal{U}_{\mathcal{L}}^i$. By signaling the inverse transform, the decoder can reconstruct a UV mesh without modifying the texture.

Figure 8:
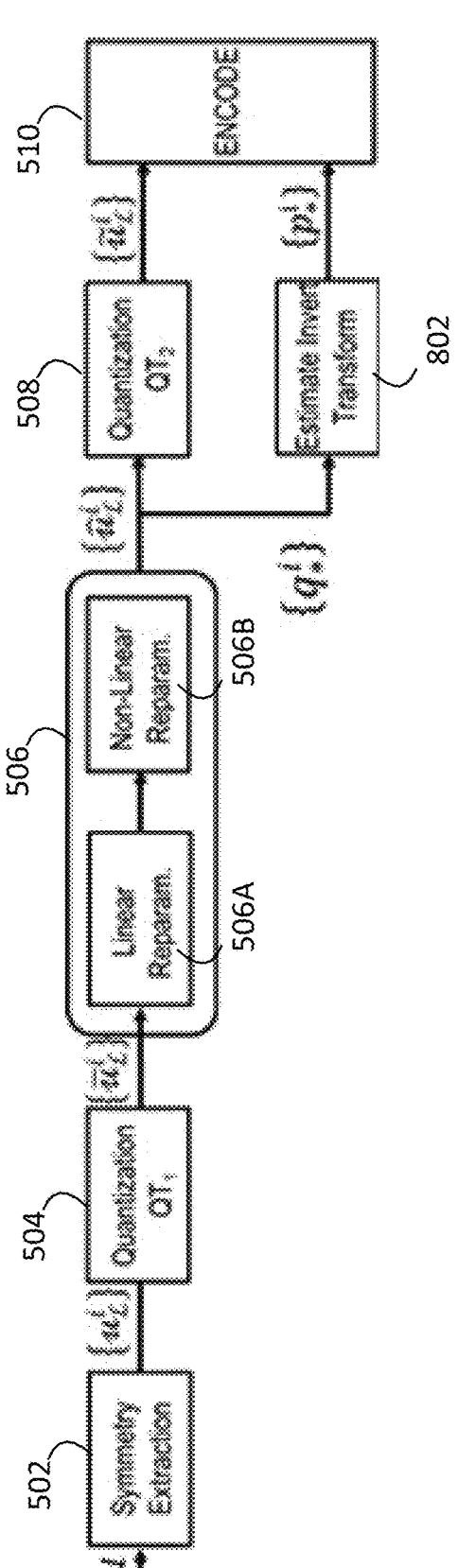
FIG. 8 is a schematic illustration of an example framework for reparameterizing a UV attribute without modifying texture, in accordance with embodiments of the present disclosure.

FIG. 8 illustrates an example framework 800 for signaling inverse transforms in a bitstream, in accordance with one or more embodiments. The processes 502, 504, 506 (506A, 506B), 508, and 510 in FIG. 8 may be the same as the processes described for FIG. 5 having the same reference numeral number. The reparameterization process 506 may compute a set optimal transforms $$\{q_*^i\}$$

as discussed above. After the optimal transforms are computed, an estimate inverse transform process 802 process may be performed to determine an inverse transform $$\{p_*^i\}$$

as discussed above for each determined optimal transform $$\{q_*^i\}.$$

According to one or more embodiments, a framework to reparameterize a UV attribute for lossless compression is performed. In this case, 2D transforms are restricted to transition only to avoid the interpolation of a new UV attribute. With the quantized input and integer transition only, the transform distortion becomes zero. Therefore, with signaled integer transition, a decoder can reconstruct the original UV with lossless coding.

FIG. 9 illustrates a flowchart of an example process 900 for performing adaptive quantization on a mesh. The process 900 may be performed by the encoder 203 (FIG. 2).

The process may start at operation S902 where a symmetry extraction process is performed on an input mesh to generate an extracted mesh. For example, the symmetry extraction process 502 may be performed on input mesh $\mathcal{U}$ to generate half symmetry mesh $\mathcal{U}_{\mathcal{L}}$ as the extracted mesh.

The process may proceed to operation S904 where a first quantization process is performed on the extracted mesh to generate first quantized mesh. For example, the first quantization process 504 may be performed on the half symmetry mesh to generate a first quantized mesh. The first quantization process 504 may be performed in accordance with Eq. (1) based on a first bitdepth $QT_1$.

The process may proceed to operation S906 where a reparameterized process is performed on the first quantized mesh to generate a reparameterized mesh. For example the reparameterization process 506 may be performed on the first quantized mesh. The reparameterization process 506 may include the linear process 506A and the non-linear process 506B. The reparameterization process may determine a set of optimal transforms $$\{q_*^i\}$$

as discussed above.

The process may proceed to operation S908 where a second quantization process is performed on the reparameterized mesh to generate a second quantized mesh. For example, the second quantization process 508 may be performed on the reparameterized mesh. The second quantization process 508 may be performed based on a quantization step size determined in accordance with Eq. (1) based on the bitdepth $QT_2$ and the parameters of a bounding box that encloses the reparameterized mesh.

The process proceeds to operation S910 where the second quantized mesh is encoded to generate a bitstream. The bitstream may include the inverse transforms determined in accordance with the estimate inverse transform process 508. In one or more examples, symmetry prediction may be performed on the second quantized mesh to determine a symmetric vertex for each vertex in the second quantized mesh along with a correspond displacement. Each determined displacement may be included in the bitstream.

FIG. 10 is a flow chart of an example process 1000 for performing adaptive dequantization, in accordance with embodiments of the present disclosure. The process 1000 may be performed by the video decoder 210 (FIG. 2).

The process may start at operation S1002 where a received bitstream is decoded to extract an encoded mesh. The bitstream may correspond to a bitstream generated in accordance with operation 900 (FIG. 9). The bitstream may be further decoded to extract one or more inverse transforms and one or more displacements.

The process proceeds to operation S1004 where a first dequantization process is performed on the encoded mesh to generate a first dequantized mesh. The first dequantization process may be performed in accordance with Eq. (2) based on a step size determined based on bitdepth $QT_2$ and parameters of a bounding box that enclose the encoded mesh.

The process proceeds to operation S1006 where a reparameterization process is performed on the first dequantized mesh to generate a reparameterized mesh. The reparameterization process performed by the decoder 210 may use the one or more inverse transforms decoded from the bitstream to generate the reparameterized mesh.

The process proceeds to operation S1008 where a second dequantization process is performed on the reparameterized mesh to generate a second dequantized mesh. The second dequantization process may be performed in accordance with Eq. (2) based on a step size determined based on $QT_1$ and parameters of a bounding box that enclose the reparameterized mesh.

The process proceeds to operation S1010 where a mesh is reconstructed based on the second dequantized mesh. The reconstruction of the mesh may include performing symmetry prediction based on the one or more displacements included in the bitstream to reconstruct the mesh.

The techniques, described above, may be implemented as computer software using computer-readable instructions and physically stored in one or more computer-readable media. For example, FIG. 11 shows a computer system 1100 suitable for implementing certain embodiments of the disclosure.

The computer software may be coded using any suitable machine code or computer language, that may be subject to assembly, compilation, linking, or like mechanisms to create code including instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 11:
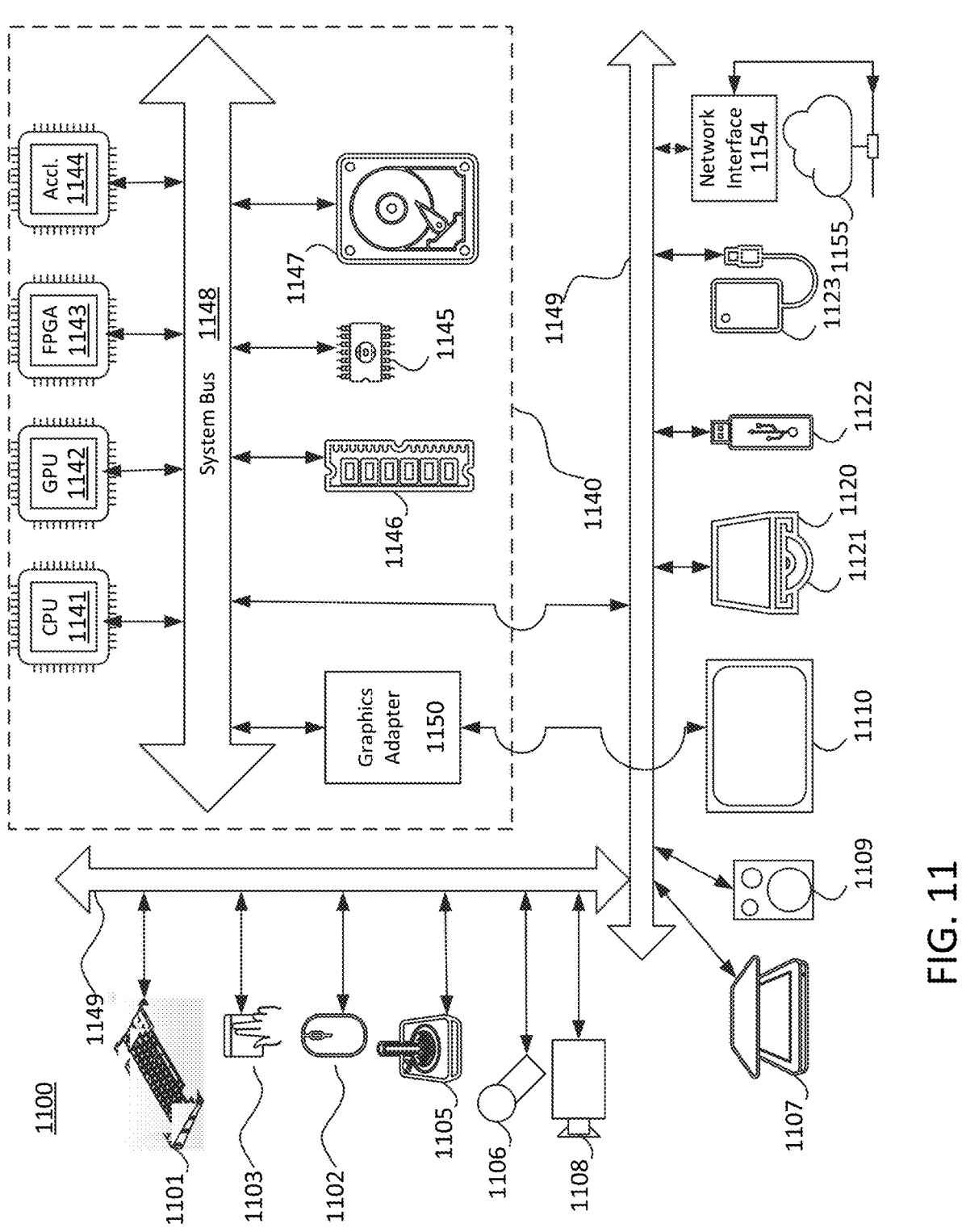
FIG. 11 is a diagram of a computer system suitable for implementing the embodiments of the present disclosure.

The components shown in FIG. 11 for computer system 1100 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 1100.

Computer system 1100 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices may also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1101, mouse 1102, trackpad 1103, touch screen 1110, data-glove, joystick 1105, microphone 1106, scanner 1107, camera 1108.

Computer system 1100 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1110, data glove, or joystick 1105, but there may also be tactile feedback devices that do not serve as input devices). For example, such devices may be audio output devices (such as: speakers 1109, headphones (not depicted)), visual output devices (such as screens 1110 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1100 may also include human accessible storage devices and their associated media such as optical media including CD/DVD ROM/RW 1120 with CD/DVD or the like media 1121, thumb-drive 1122, removable hard drive or solid state drive 1123, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1100 may also include interface to one or more communication networks. Networks may be wireless, wireline, optical. Networks may further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 1149 (such as, for example USB ports of the computer system 1100; others are commonly integrated into the core of the computer system 1100 by attachment to a system bus as described below (for example Ethernet interface into a PC computer system or cellular network interface into a smartphone computer system). Using any of these networks, computer system 1100 may communicate with other entities. Such communication may be uni-directional, receive only (for example, broadcast TV), uni-directional send-only (for example CANbus to certain CANbus devices), or bi-directional, for example to other computer systems using local or wide area digital networks. Such communication may include communication to a cloud computing environment 1155. Certain protocols and protocol stacks may be used on each of those networks and network interfaces as described above.

Aforementioned human interface devices, human-accessible storage devices, and network interfaces 1154 may be attached to a core 1140 of the computer system 1100.

The core 1140 may include one or more Central Processing Units (CPU) 1141, Graphics Processing Units (GPU) 1142, specialized programmable processing units in the form of Field Programmable Gate Areas (FPGA) 1143, hardware accelerators for certain tasks 1144, and so forth. These devices, along with Read-only memory (ROM) 1145, Random-access memory 1146, internal mass storage such as internal non-user accessible hard drives, SSDs, and the like 1147, may be connected through a system bus 1148. In some computer systems, the system bus 1148 may be accessible in the form of one or more physical plugs to enable extensions by additional CPUs, GPU, and the like. The peripheral devices may be attached either directly to the core's system bus 1148, or through a peripheral bus 1149. Architectures for a peripheral bus include PCI, USB, and the like. A graphics adapter 1150 may be included in the core 1140.

CPUs 1141, GPUs 1142, FPGAs 1143, and accelerators 1144 may execute certain instructions that, in combination, may make up the aforementioned computer code. That computer code may be stored in ROM 1145 or RAM 1146. Transitional data may be also be stored in RAM 1146, whereas permanent data may be stored for example, in the internal mass storage 1147. Fast storage and retrieve to any of the memory devices may be enabled through the use of cache memory, that may be closely associated with one or more CPU 1141, GPU 1142, mass storage 1147, ROM 1145, RAM 1146, and the like.

The computer readable media may have computer code thereon for performing various computer-implemented operations. The media and computer code may be those specially designed and constructed for the purposes of the present disclosure, or they may be of the kind well known and available to those having skill in the computer software arts.

As an example and not by way of limitation, the computer system having architecture 1100, and specifically the core 1140 may provide functionality as a result of processor(s) (including CPUs, GPUs, FPGA, accelerators, and the like) executing software embodied in one or more tangible, computer-readable media. Such computer-readable media may be media associated with user-accessible mass storage as introduced above, as well as certain storage of the core 1140 that are of non-transitory nature, such as core-internal mass storage 1147 or ROM 1145. The software implementing various embodiments of the present disclosure may be stored in such devices and executed by core 1140. A computer-readable medium may include one or more memory devices or chips, according to particular needs. The software may cause the core 1140 and specifically the processors therein (including CPU, GPU, FPGA, and the like) to execute particular processes or particular parts of particular processes described herein, including defining data structures stored in RAM 1146 and modifying such data structures according to the processes defined by the software. In addition or as an alternative, the computer system may provide functionality as a result of logic hardwired or otherwise embodied in a circuit (for example: accelerator 1144), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The above disclosure also encompasses the embodiments listed below:

(1) A method performed by at least one processor of an encoder comprises extracting from an input mesh an extracted half symmetry mesh, the input mesh comprising a first side and a second side, the second side being opposite to the first side, the extracted mesh comprising only one of the first side and the second side; quantizing the extracted half symmetry mesh at a first bitdepth to generate a first quantized mesh; reparameterizing the first quantized mesh to generate a reparameterized mesh that includes a reduction in one or more empty spaces in the first quantized mesh; quantizing the reparameterized mesh at a second bit-depth different from the first bitdepth to generate a second quantized mesh; and encoding the second quantized mesh into a bitstream.

(2) The method according to feature (1), in which the second bitdepth is less than the first bitdepth.

(3) The method according to feature (1) or (2), in which the extracted mesh is bounded by a first 2D bounding box that circumscribes the extracted mesh, the first 2D bounding box defined in a 2D space by (i) a first maximum coordinate and a first minimum coordinate in a first direction and (ii) a second maximum coordinate and a second minimum coordinate in a second direction orthogonal to the first direction.

(4) The method according to feature (3), in which the quantizing the extracted mesh is based on a first quantization step and the first bitdepth, and in which the first quantization step is determined based on (i) a maximum of (a) a difference between the first maximum coordinate and the first minimum coordinate and (b) a difference between the second maximum coordinate and the second minimum coordinate and (ii) the first bitdepth.

(5) The method according to feature (3) or (4), in which the reparameterizing comprises linear reparameterization and non-linear reparameterization process, in which the linear reparameterization comprises performing a linear transform on the first quantized mesh to reduce empty spaces in the first quantized mesh, and in which the non-linear reparameterization comprises performing a non-linear process on an output of the linear reparameterization.

(6) The method according to feature (5), in which the extracted mesh is divided into M disconnected segments, in which the reparameterizing comprises determining a transform for each disconnected segment that minimizes a total area of the extracted mesh such that the reparameterized mesh defined by a second 2D bounding box that has an area smaller than an area of the first 2D bounding box.

(7) The method according to feature (6), in which the second 2D bounding box is defined in the 2D space by (i) a third maximum coordinate and a third minimum coordinate in the first direction and (ii) a fourth maximum coordinate and a fourth minimum coordinate in the second direction.

(8) The method according to feature (7), in which the quantizing the reparameterized mesh is based on a second quantization step and the second bitdepth, and in which the second quantization step is determined based on (i) a maximum of (a) a difference between the third maximum coordinate and the third minimum coordinate and (b) a difference between the fourth maximum coordinate and the fourth minimum coordinate and (ii) the second bitdepth.

(9) The method according to any one of features (6)-(8), further comprising: determining for each determined transform for each segment, a corresponding inverse transform, and in which the bitstream includes each determined inverse transform.

(10) An encoder comprises at least one memory configured to store program code; and at least one processor configured to read the program code and operate as instructed by the program code, the program code including: extraction code configured to cause the at least one processor to extract from an input mesh an extracted half symmetry mesh, the input mesh comprising a first side and a second side, the second side being opposite to the first side, the extracted half symmetry mesh comprising one of the first side and the second side, first quantization code configured to cause the at least one processor to quantize the extracted half symmetry mesh at a first bitdepth to generate a first quantized mesh, reparameterization code configured to cause the at least one processor to reparameterize the first quantized mesh to generate a reparameterized mesh that includes a reduction in one or more empty spaces in the first quantized mesh, second quantization code configured to cause the at least one processor to quantize the reparameterized mesh at a second bitdepth different from the first bitdepth to generate a second quantized mesh, and encoding code configured to cause the at least one processor to encode the second quantized mesh into a bitstream.

(11) The encoder according to feature (10), in which the second bitdepth is less than the first bitdepth.

(12) The encoder according to feature (10), in which the extracted mesh is bounded by a first 2D bounding box that circumscribes the extracted mesh, the first 2D bounding box defined in a 2D space by (i) a first maximum coordinate and a first minimum coordinate in a first direction and (ii) a second maximum coordinate and a second minimum coordinate in a second direction orthogonal to the first direction.

(13) The encoder according to feature (12), in which the first quantization code further causes the at least one processor to quantize the extracted mesh based on a first quantization step and the first bitdepth, and in which the first quantization step is determined based on (i) a maximum of (a) a difference between the first maximum coordinate and the first minimum coordinate and (b) a difference between the second maximum coordinate and the second minimum coordinate and (ii) the first bitdepth.

(14) The encoder according to feature (12), in which the reparameterization code further includes linear reparameterization and non-linear reparameterization code, wherein the linear reparameterization code causes the at least one processor to perform a linear transform on the first quantized mesh to reduce empty spaces in the first quantized mesh, and wherein the non-linear reparameterization code causes the at least one processor to perform a non-linear process on an output of the linear transform.

(15) The encoder according to feature (14), in which the extracted mesh is divided into M disconnected segments, in which the reparameterization code further comprises first determining code that causes the at least one processor to determine a transform for each disconnected segment that minimizes a total area of the extracted mesh such that the reparameterized mesh defined by a second 2D bounding box that has an area smaller than an area of the first 2D bounding box.

(16) The encoder according to feature (15), in which the second 2D bounding box is defined in the 2D space by (i) a third maximum coordinate and a third minimum coordinate in the first direction and (ii) a fourth maximum coordinate and a fourth minimum coordinate in the second direction.

(17) The encoder according to feature (16), in which the second quantization code further causes the at least one processor to quantize the reparameterized mesh based on a second quantization step and the second bitdepth, and in which the second quantization step is determined based on (i) a maximum of (a) a difference between the third maximum coordinate and the third minimum coordinate and (b) a difference between the fourth maximum coordinate and the fourth minimum coordinate and (ii) the second bitdepth.

(18) The encoder according to any one of features (15)-(18), in which the program code further comprises: second determining code configured to cause the at least one processor to determine, for each determined transform for each segment, a corresponding inverse transform, and in which the bitstream includes each determined inverse transform.

(19) A non-transitory computer readable medium having instructions stored therein, which when executed by a processor in an encoder cause the encoder to execute a method comprising: extracting from an input mesh an extracted half symmetry mesh, the input mesh comprising a first side and a second side, the second side being opposite to the first side, the extracted mesh comprising one of the first side and the second side; quantizing the extracted half symmetry mesh at a first bitdepth to generate a first quantized mesh; reparameterizing the first quantized mesh to generate a reparameterized mesh that includes a reduction in one or more empty spaces in the first quantized mesh; quantizing the reparameterized mesh at a second bitdepth different from the first bitdepth to generate a second quantized mesh; and encoding the second quantized mesh into a bitstream.

(20) The non-transitory computer readable medium according to feature (19), in which the second bitdepth is less than the first bitdepth.

What is claimed is:

1. A method performed by at least one processor of an encoder, the method comprising:

extracting from an input mesh an extracted half symmetry mesh, the input mesh comprising a first side and a second side, the second side being opposite to the first side, the extracted mesh comprising only one of the first side and the second side;

quantizing the extracted half symmetry mesh at a first bitdepth to generate a first quantized mesh;

reparameterizing the first quantized mesh to generate a reparameterized mesh that includes a reduction in one or more empty spaces in the first quantized mesh, the reparameterizing further comprising:

linear reparameterization performing a linear transform on the first quantized mesh to reduce empty spaces in the first quantized mesh, and non-linear reparameterization performing a non-linear process on an output of the linear reparameterization;

quantizing the reparameterized mesh at a second bitdepth different from the first bitdepth to generate a second quantized mesh; and encoding the second quantized mesh into a bitstream.

2. The method according to claim 1, wherein the second bitdepth is less than the first bitdepth.

3. The method according to claim 1, wherein the extracted half symmetry mesh is bounded by a first 2D bounding box that circumscribes the extracted mesh, the first 2D bounding box defined in a 2D space by (i) a first maximum coordinate and a first minimum coordinate in a first direction and (ii) a second maximum coordinate and a second minimum coordinate in a second direction orthogonal to the first direction.

4. The method according to claim 3, wherein the quantizing the extracted half symmetry mesh is based on a first quantization step and the first bitdepth, and wherein the first quantization step is determined based on (i) a maximum of (a) a difference between the first maximum coordinate and the first minimum coordinate and (b) a difference between the second maximum coordinate and the second minimum coordinate and (ii) the first bitdepth.

5. The method according to claim 3, wherein the extracted mesh is divided into M disconnected segments, wherein the reparameterizing comprises determining a transform for each disconnected segment that minimizes a total area of the extracted half symmetry mesh such that the reparameterized mesh defined by a second 2D bounding box that has an area smaller than an area of the first 2D bounding box.

6. The method according to claim 5, wherein the second 2D bounding box is defined in the 2D space by (i) a third maximum coordinate and a third minimum coordinate in the first direction and (ii) a fourth maximum coordinate and a fourth minimum coordinate in the second direction.

7. The method according to claim 6, wherein the quantizing the reparameterized mesh is based on a second quantization step and the second bitdepth, and wherein the second quantization step is determined based on (i) a maximum of (a) a difference between the third maximum coordinate and the third minimum coordinate and (b) a difference between the fourth maximum coordinate and the fourth minimum coordinate and (ii) the second bitdepth.

8. The method according to claim 5, further comprising:

determining for each determined transform for each segment, a corresponding inverse transform, and wherein the bitstream includes each determined inverse transform.

9. A method performed by at least one processor of an encoder, the method comprising:

decoding a received bitstream to extract from an encoded mesh an extracted half symmetry mesh, the encoded mesh comprising a first side and a second side, the second side being opposite to the first side, the extracted half symmetry mesh comprising one of the first side and the second side, dequantizing the extracted half symmetry mesh at a first bitdepth to generate a first quantized dequantized mesh, reparameterizing the first dequantized mesh to generate a reparameterized mesh that includes a reduction in one or more empty spaces in the first quantized mesh, the reparameterizing further comprising:

linear reparameterization performing a linear transform on the first dequantized mesh to reduce empty spaces in the first quantized mesh, and non-linear reparameterization performing a non-linear process on an output of the linear reparameterization, dequantizing the reparameterized mesh at a second bitdepth different from the first bitdepth to generate a second dequantized mesh, and reconstructing the encoded mesh based on the second dequantized mesh.

10. The method according to claim 9, wherein the second bitdepth is less than the first bitdepth.

11. The method according to claim 9, wherein the extracted half symmetry mesh is bounded by a first 2D bounding box that circumscribes the extracted mesh, the first 2D bounding box defined in a 2D space by (i) a first maximum coordinate and a first minimum coordinate in a first direction and (ii) a second maximum coordinate and a second minimum coordinate in a second direction orthogonal to the first direction.

12. The method according to claim 11, wherein the dequantizing the extracted half symmetry mesh is based on a first quantization step and the first bitdepth, and wherein the first quantization step is determined based on (i) a maximum of (a) a difference between the first maximum coordinate and the first minimum coordinate and (b) a difference between the second maximum coordinate and the second minimum coordinate and (ii) the first bitdepth.

13. The method according to claim 11, wherein the extracted mesh is divided into M disconnected segments, wherein the reparameterization further comprises determining a transform for each disconnected segment that minimizes a total area of the extracted half symmetry mesh such that the reparameterized mesh defined by a second 2D bounding box that has an area smaller than an area of the first 2D bounding box.

14. The method according to claim 13, wherein the second 2D bounding box is defined in the 2D space by (i) a third maximum coordinate and a third minimum coordinate in the first direction and (ii) a fourth maximum coordinate and a fourth minimum coordinate in the second direction.

15. The method according to 14, wherein the dequantizing the reparameterized mesh based on a second quantization step and the second bitdepth, and wherein the second quantization step is determined based on (i) a maximum of (a) a difference between the third maximum coordinate and the third minimum coordinate and (b) a difference between the fourth maximum coordinate and the fourth minimum coordinate and (ii) the second bitdepth.

16. The method according to claim 13, wherein the bitstream includes at least one inverse transform.

17. A non-transitory computer readable medium storing a bitstream generated by a method comprising:

extracting from an input mesh an extracted half symmetry mesh, the input mesh comprising a first side and a second side, the second side being opposite to the first side, the extracted mesh comprising one of the first side and the second side;

quantizing the extracted half symmetry mesh at a first bitdepth to generate a first quantized mesh;

reparameterizing the first quantized mesh to generate a reparameterized mesh that includes a reduction in one or more empty spaces in the first quantized mesh, the reparameterizing further comprising:

linear reparameterization performing a linear transform on the first quantized mesh to reduce empty spaces in the first quantized mesh, and non-linear reparameterization performing a non-linear process on an output of the linear reparameterization;

quantizing the reparameterized mesh at a second bitdepth different from the first bitdepth to generate a second quantized mesh; and encoding the second quantized mesh into the bitstream.

18. The non-transitory computer readable medium according to claim 17, wherein the second bitdepth is less than the first bitdepth.

* * * * *